United States Patent [19]
Miller et al.

[11] Patent Number: 5,317,278
[45] Date of Patent: May 31, 1994

[54] SWITCHED ACTIVE FAULT LOCATE FILTER

[75] Inventors: Albert H. Miller, Carmichael; Maynard A. Wright, Citrus Heights, both of Calif.

[73] Assignee: RC Concepts, Inc., Foresthill, Calif.

[21] Appl. No.: 873,599

[22] Filed: Apr. 21, 1992

Related U.S. Application Data

[63] Continuation of Ser. No. 557,603, Jul. 23, 1990, abandoned.

[51] Int. Cl.$^5$ .................. H04B 17/02; H03K 11/00
[52] U.S. Cl. .................................. 328/167; 328/138; 375/3.1; 375/4; 371/20.2; 370/13.1; 379/26; 307/524
[58] Field of Search ................ 375/3.1, 4; 371/20.2, 371/30; 370/13.1; 379/26; 307/520, 521, 262, 271, 522, 524; 328/165, 167, 138, 162

[56] References Cited

U.S. PATENT DOCUMENTS

| | | |
|---|---|---|
| 3,062,927 | 11/1962 | Hamori . |
| 3,083,270 | 3/1963 | Mayo . |
| 3,909,563 | 9/1975 | Ghosh et al. ............ 375/3 |
| 3,962,635 | 6/1976 | Roza ...................... 375/4 |
| 3,992,581 | 11/1976 | Davis ..................... 375/3 |
| 4,022,988 | 5/1977 | Lentz et al. ............. 375/3.1 |
| 4,187,415 | 2/1980 | Boutny et al. ........... 375/3.1 |
| 4,220,833 | 9/1980 | West et al. .............. 375/3.1 |
| 4,319,080 | 3/1982 | Kuwahara ............... 375/3.1 |
| 4,604,745 | 8/1986 | Takasaki et al. ......... 375/3.1 |

FOREIGN PATENT DOCUMENTS 0101203  8/1979  Japan ........................ 375/3.1

Primary Examiner—Timothy P. Callahan
Attorney, Agent, or Firm—Knobbe, Martens, Olson & Bear

[57] ABSTRACT

In locating a faulty regenerator, a fault locating filter is used in a T1 or T1C Carrier Repeater Apparatus Case or Office Repeater Bay (ORB) to select the appropriate fault locate sinusoid from the output winding of the repeater. This process uses three different filter types at twelve different frequencies. Conventional filter design requires a different filter for each frequency leading to the need to stock 36 different filters. This patent covers the design of a filter which may be optioned to provide all three types and twelve frequencies within a single unit, reducing the required inventory of such filters by a substantial amount.

13 Claims, 3 Drawing Sheets

SWITCHED ACTIVE FAULT LOCATE FILTER

This application is a continuation of application Ser. No. 07/557,603, filed Jul. 23, 1990, now abandoned.

BACKGROUND OF INVENTION

When a fault is detected in a T-carrier span (either T1 or T1C) a fault locate signal is placed on the digital line. This signal is a digital signal with bipolar violations, set in triplet (trio) placed with spacing so as to create a low frequency energy on the line to develop a predetermined signal (frequency). If the signal passes through the filter it is an indication that the regenerator associated with that filter is functioning properly. If no signal is passed it indicates that the regenerator, the cable or either of the two apparatus cases involved is defective and should be replaced.

SUMMARY OF THE INVENTION

This fault locate filter may be set, using convenient option blocks, to operate at any one of the twelve standard fault locating frequencies. This filter may also be optioned to provide either of the two current standard methods of testing, single-ended (1115 type) or double-ended (1114 type) fault locating. The output impedance of the filter changes as a function of whether the filter is turned on or off. This unique design gives the filter a very high output impedance when the filter is turned off. This occurs when fault locate frequencies other than the one for which the filter is optioned are in use, preventing the introduction of impedance irregularities into the loaded fault locate pair. The output impedance of the filter is 500 Ohms at the center of its passband when turned on by the appropriate receive frequency.

DESCRIPTION OF THE PREFERRED EMBODIMENT

The existing filter designs allow the filter to pass signals even though the regenerator has marginal performance. A signal will pass through the passband due to the characteristic of the filter windings. Other filters along the line will also allow a certain amount of energy to pass through their windings compromising the quality of the signal received by the detector (see FIG. 1). Due to the narrow passband of the subject filter filter this energy is not able to pass and the other filters in the span will not switch on therefore maintaining their high impedance on the line and not passing any energy to the detector. The bandpass of the subject filter is only limited by the test instrument that is generating the signal and its ability to detect the signal.

In existing filters the physical size of the windings of the filter enables the filters to pass only a single frequency. Due to the uniqueness of the subject filter filter all twelve frequencies can be handled by a single filter which can, in addition, be optioned for either single-ended or double-ended fault locate operation.

Existing filters terminate the line with 500 Ohms for each filter whether the filter is active or not. The subject filter has a very high output impedance, greater than two million ohms, at fault locate frequencies other than for which it is optioned, preventing the introduction of impedance irregularities to the loaded fault located pair. The output impedance of the subject filter, however, is still 500 Ohms at the selected frequency when the filter is switched "on".

Figure 1:
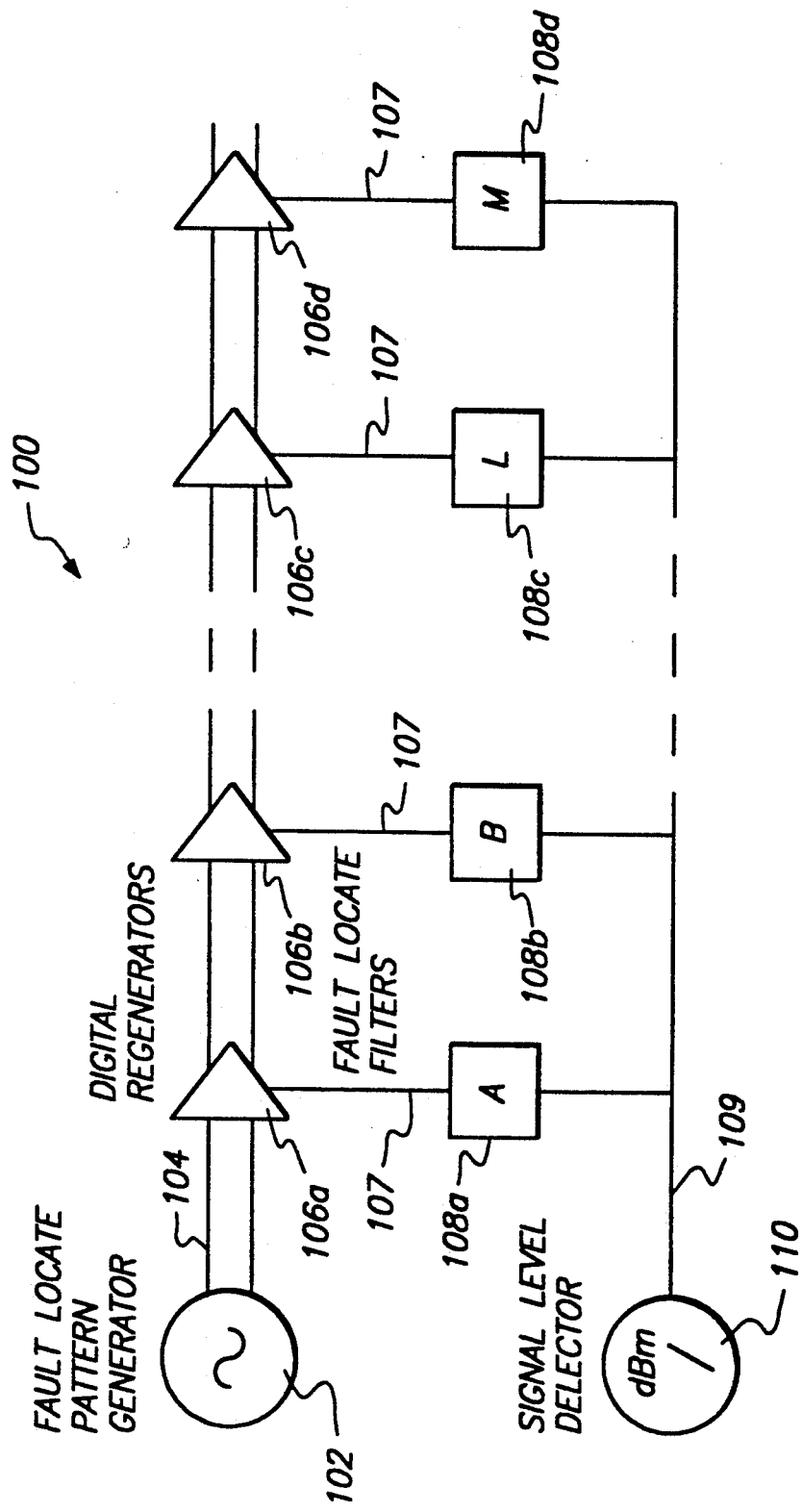
FIG. 1 presents an overview of a typical T1/T1C repeatered carrier line and its associated fault locate filters/line.

FIG. 1 shows a simplified block diagram of a T-carrier fault detection system generally indicated at 100. At one end of the system 100, a fault locate pattern generator 102 provides a pulse coded modulation (PCM) test signal. The test signal, as defined by Bell Telephone Laboratories, comprises the electrical equivalent of tones in the voice frequency (VF) band. The tones, which are bipolar violations in a triplet form, are introduced into a T-carrier line 104, the well-known North American standard carrier for telephone equipment including telephones, modems, facsimiles, and so forth. As the tones attenuate with distance, a set of digital repeaters or regenerators 106a, 106b, 106c, 106d are placed at prespecified intervals in the T-carrier line 104.

The different tones created by the generator 102 correspond to the filter bandwidth of a set of fault locate filters 108a, 108b, 108c, 108d connected to respective repeaters 106 by line pairs 107. To distinguish a tone received at a particular regenerator 106 on the line 104, each filter 108 is tuned to the unique frequency of a predetermined tone. Thus, in the prior art system 100, each filter 108 is selected to bandpass only a single tone. For example, the filter 108a passes a tone produced by the generator 102, designated "A", which after reception is normally output onto a test line 109. If the signal generated from the generator 102 is received along the test line 109 by a signal level detector 110, the regenerator 106a is then confirmed to be in working condition. Otherwise, if the tone "A" is not received by the detector 110, the regenerator 106a is assumed to be faulty and must be repaired or replaced. Similarly, the other regenerators 106 in the line 104 may be individually tested.

The polarity of the office power supplied to the filters 108 is used to select which one of the two regenerators normally contained in a T-carrier repeater 106 (for instance, the repeater 106 may be configured for bidirectional transmissions) is selected. This method is termed "single-ended fault locating" and, using 1115 filters manufactured by Western Electric, both directions of transmission may be fault located from one end of the T-carrier line 104. If this method is not used, the method is termed "double-ended fault locating" and, using 1114 filters also manufactured by Western Electric, both ends of the T-carrier line 104 must be used to test both the regenerators contained in the repeater 106.

Figure 2:
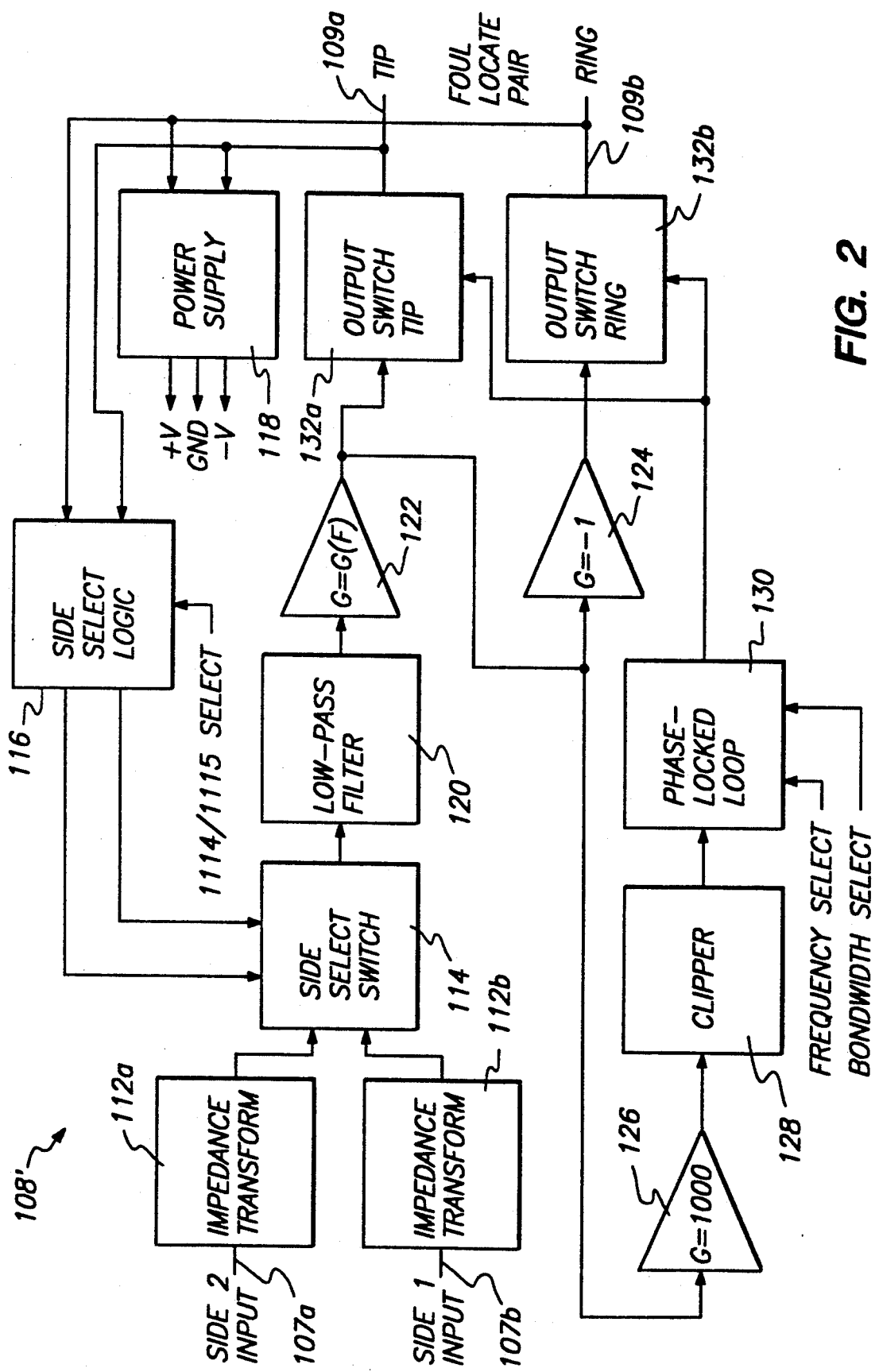
FIG. 2 is the synthesized filter detailing the necessary blocks used to achieve the filter functionality.
Figure 3:
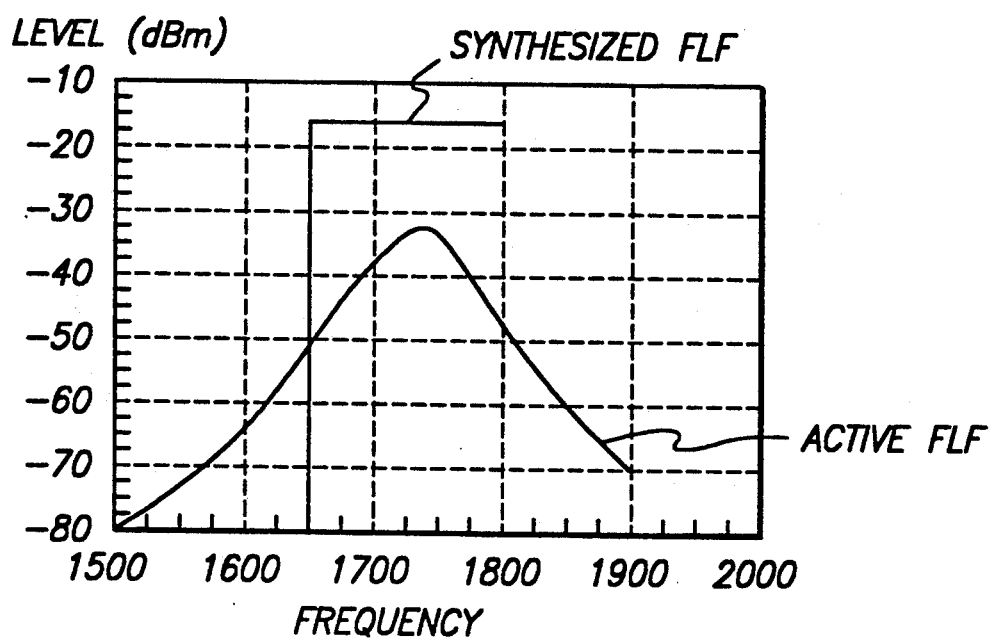
FIG. 3 gives the frequency response of both the traditional fault locate filter and the synthesized fault locate filter.

FIG. 2 shows the improved fault locate filter 108' of the present invention. Since a T-carrier repeater will normally have two digital regenerators, wherein both can be used in a single direction or each can be used for opposite direction operation, the fault locate filter 108' provides for two input lines labeled 107a and 107b. Two transformers 112a, 112b are used to match the impedance of the filter 108' to the two regenerators of the repeater 106 (FIG. 1). Input switching to select the proper input line 107 is controlled by the polarity of the DC voltage applied to the fault locate pair 109. This function is shown in FIG. 2 as a side select switch 114 and an accompanying side select logic circuit 116. The side select logic 116 receives signals from the TIP and RING lines 109a, 109b. When the TIP signal is more positive than the RING signal, the side 2 input 104a is connected to the main circuitry of the filter 108'. On the other hand, when the RING signal is more positive than the TIP signal, the side 1 input 104b is allowed to enter the main circuitry of the filter 108'.

The filter 108' is powered by a power supply 118 which also receives the TIP and RING signals from the lines 109. If the double-ended mode is selected in the side select logic 116, the filter 108' is only powered when the TIP signal is more positive than the RING signal.

The output from the side select switch 114 is fed into a low pass filter 120. The low pass filter, for example, an RC circuit, provides further isolation from frequencies in the digital repeaters which are well above the cut-off frequency of the filter 108'. The signal supplied by the digital repeater 106 (FIG. 1) is of a very low amplitude, and its amplitude is also a function of frequency due to the frequency response to the output transformer of the repeater 106. Therefore, the output of the low pass filter 120 is fed into an amplifier 122 which provides a gain matched to the characteristics of the digital repeater input (G=G(f)) to give a constant output of the filter to various audio frequencies produced by test patterns received from the generator 102 (FIG. 1). The amplified signal from the amplifier 122 is fed into an inverting amplifier (G=−1) 124 and to an output switch TIP 132a. Invertor 124 inverts the output signal for balanced transmission over the fault locate pair 109 and applies the inverted signal to an output switch RING 132b.

The amplified output from the amplifier 122 is also fed to an amplifier (G=1,000) 126. The gain of that amplifier 126 provides that the signal fed to a clipper 128 will at all times be well above the clipping level. Thus, the signal output from the clipper 128 is fed to a phase-locked loop 130. The phase-locked loop 130 detects a preselected signal frequency. The configuration of the preferred phase-locked loop 130 is a "tone detector" allowing the center frequency of the detection band to be selected by varying the free-run frequency of the phase-locked loop 130. The phase-locked loop 130 is preferably, for example, a commonly available industry standard "tone decoder" referred to as an LM567 available from National Semiconductor or Motorola, Inc. as part number LM567C. As is well known in the art, the detection bandwidth of the phase-locked loop 130 is determined by the value of the capacitor connected to the loop filter of the phase-locked loop 130. In the preferred embodiment, the bandwidth select feature of the present invention is implemented by a plurality of capacitors, having different capacitance values, selectively connected in series to the loop filter input pin of the phase-locked loop 130 via a dip switch. As is also well known in the art, the center frequency of the voltage-controlled oscillator, which determines the locking frequency of the phase-locked loop 130, is determined by the value of the resistance connected to the timing input pins of the phase-locked loop 130. In the preferred embodiment, the frequency select feature of the present invention is implemented by a plurality of resistors, having different resistance values, selectively connected to the timing input pins of the phase-locked loop 130 via a dip switch. The bandwidth of the phase-locked loop 130 is determined by the loop filter.

Accordingly, when the input signal is within a frequency band specified by the frequency and bandwidth select inputs of the phase-locked loop 130, the phase-locked loop 130 will output a preselected signal level. The preselected signal level is then applied to the output switch 132a for the TIP line 109a and the output switch 132b for the RING line 109b. Upon receiving the appropriate signals, the switches 132 transfer the audio portion of the test signal supplied by the digital repeater 106 (FIG. 1) to the test line or fault locate pair 109, which is then received by the level detector 110 shown in FIG. 1.

Due to the narrow pass band of the fault detect filter 108' of the present invention, the other filters 108' in the T-carrier span 104 do not switch on, and maintain their high impedance on the line so as to not pass any energy to the detector 110. Furthermore, in existing filters, the physical size of the windings of the filter enables the filters to pass only a single frequency. However, due to the flexibility of the present filter 108', all twelve test tones can be handled by a single filter which can, in addition, be optioned for either single-ended or double-ended fault locate operation.

What is claimed:

1. In a telephone network having a plurality of regenerators, a fault locate filter, comprising:
    a constant gain amplifier providing a constant gain amplified signal matched to a plurality of test frequencies wherein an input signal comprises a selected one of the test frequencies;
    a phase-locked loop detecting the selected test frequency in the amplified signal; and
    a switch controlled by the phase-locked loop wherein only detection of the selected frequency causes the switch to be activated so as to gate the amplified signal onto a test line, wherein the input signal is received from a T-carrier line.

2. The filter defined in claim 1, wherein the phase-locked loop is receivably connected to a clipper, the clipper receivably connected to a high gain amplifier, and the high gain amplifier receivably connected to the constant gain amplifier so as to maintain only the frequency information of the input signal.

3. The filter defined in claim 1, additionally comprising means, connected to a low-pass filter which is connected to the constant gain amplifier, for selecting between two input signals.

4. The filter defined in claim 1, wherein the switch comprises a first switch having an output connected to a TIP line and a second switch having an invertor connected to an input, the invertor receiving the amplified input signal, wherein the second switch has an output connected to a RING line.

5. The filter defined in claim 3, wherein the selecting means includes means for selecting between single-ended and double-ended operation of the filter.

6. A method of bandpass filtering an input signal, comprising the steps of:
    amplifying and clipping the input signal;
    detecting a frequency in the input signal;
    locking the detected frequency; and
    providing the input signal as an output when the detected frequency is locked.

7. The method of filtering defined in claim 6, wherein the locking step includes a selectable bandwidth.

8. The method of filtering defined in claim 6, wherein the locking step includes a selectable center frequency.

9. The method of filtering defined in claim 6, additionally comprising the step of selecting between one of two signals to provide the input signal.

10. A fault locating filter in a telephone network, comprising:
    means for phase-locking a signal, the phase-locking means having means for detecting a predetermined frequency of the signal;
    a switch controlled by the phase-locking means, the switch receiving the signal and selectively passing the signal when the predetermined frequency is detected by the phase-locking detecting means; and
    means connected to the switch for controlling the output amplitude and phase of the signal.

11. The filter defined in claim 10, additionally comprising a side select circuit for selecting between single-ended and double-ended operation of the filter.

12. The filter defined in claim 10, additionally comprising means connected to the side select circuit for impedance transforming the signal.

13. The filter defined in claim 10, additionally comprising an inverter for providing a balanced output.

* * * * *